United States Patent
Tojiki et al.

(10) Patent No.: US 12,462,679 B2
(45) Date of Patent: Nov. 4, 2025

(54) INFORMATION PROCESSING DEVICE AND NON-TRANSITORY STORAGE MEDIUM

(71) Applicant: TOYOTA JIDOSHA KABUSHIKI KAISHA, Toyota (JP)

(72) Inventors: Hajime Tojiki, Musashino (JP); Takayuki Yamabe, Shinagawa-ku Tokyo-to (JP); Tetsuya Hashimoto, Shinagawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 18/382,765

(22) Filed: Oct. 23, 2023

(65) Prior Publication Data
US 2024/0177600 A1    May 30, 2024

(30) Foreign Application Priority Data
Nov. 29, 2022   (JP) .................. 2022-190819

(51) Int. Cl.
| | |
|---|---|
| G08G 1/01 | (2006.01) |
| G06T 7/70 | (2017.01) |
| G06V 10/70 | (2022.01) |
| G06V 20/54 | (2022.01) |
| G08G 1/052 | (2006.01) |

(52) U.S. Cl.
CPC ............ *G08G 1/0133* (2013.01); *G06T 7/70* (2017.01); *G06V 10/70* (2022.01); *G06V 20/54* (2022.01); *G08G 1/0129* (2013.01); *G08G 1/052* (2013.01); *G06T 2207/20081* (2013.01); *G06T 2207/30236* (2013.01); *G06V 2201/08* (2022.01)

(58) Field of Classification Search
CPC .... G08G 1/0133; G08G 1/0129; G08G 1/052; G06T 7/70; G06T 2207/20081; G06T 2207/30236; G06V 10/70; G06V 20/54; G06V 2201/08
See application file for complete search history.

(56) References Cited

U.S. PATENT DOCUMENTS

| | | | |
|---|---|---|---|
| 2020/0160709 A1* | 5/2020 | Ramot | G06Q 10/047 |
| 2023/0160709 A1* | 5/2023 | Higuchi | G06Q 30/04 |
| | | | 701/424 |
| 2023/0215272 A1* | 7/2023 | Liu | G08G 1/0112 |
| | | | 340/932.2 |
| 2023/0237852 A1* | 7/2023 | Kim | G06Q 10/047 |
| 2023/0254676 A1* | 8/2023 | Ståhl | H04W 8/245 |
| | | | 455/419 |
| 2024/0177600 A1* | 5/2024 | Tojiki | G06V 10/70 |

FOREIGN PATENT DOCUMENTS

| | | |
|---|---|---|
| JP | 2010-128732 A | 6/2010 |
| JP | 2018-181024 A | 11/2018 |

\* cited by examiner

*Primary Examiner* — Hussein Elchanti
(74) *Attorney, Agent, or Firm* — Dinsmore & Shohl LLP

(57) ABSTRACT

An information processing device, includes: a memory; and a processor coupled to the memory, wherein the processor is configured to: acquire a captured image, which is captured from above, of a region including a road area, position information for a vehicle that is positioned in the region, and operation information relating to an operation of the vehicle; use the position information and the operation information to determine a parking area in which the vehicle is parked; and use the parking area to identify the road area included in the captured image, extract vehicles present in the road area, and estimate a traffic volume in the road area.

5 Claims, 8 Drawing Sheets

INFORMATION PROCESSING DEVICE AND NON-TRANSITORY STORAGE MEDIUM

CROSS-REFERENCE TO RELATED APPLICATION

This application is based on and claims priority under 35 USC 119 from Japanese Patent Application No. 2022-190819 filed on Nov. 29, 2022, the disclosure of which is incorporated by reference herein.

BACKGROUND

Technical Field

The present disclosure relates to an information processing device and a non-transitory storage medium which estimate a traffic volume by vehicles traveling on a road.

Related Art

Japanese Patent Application Laid-Open (JP-A) No. 2010-128732 discloses a vehicle density observation device that extracts a vehicle line segment group indicating vehicles, using an input image that is captured from above, derives the density of the vehicle line segment group for each local region, and presents the derived density of the vehicle line segment group by combining the density on corresponding map information.

In recent years, there is a technique of extracting vehicles from a captured image, actually captured from above, and estimating the traffic volume of a road area from the extracted vehicles.

However, in a case in which a traffic volume is estimated using a captured image, for example, a vehicle that is parked in a parking area may be erroneously extracted. For this reason, it has not been possible to accurately estimate the traffic volume of vehicles in a road area.

SUMMARY

The present disclosure provides an information processing device and an information processing program which are capable of accurately estimating a traffic volume of vehicles in a road area in a case in which the traffic volume is estimated using a captured image.

An information processing device according to a first aspect includes: an acquisition section that is configured to acquire a captured image, which is captured from above, of a region including a road area, position information for a vehicle that is positioned in the region, and operation information relating to an operation of the vehicle; a determination section that is configured to use the position information and the operation information to determine a parking area in which the vehicle is parked; and an estimation section that is configured to use the parking area to identify the road area included in the captured image, extract vehicles present in the road area, and estimate a traffic volume in the road area.

The information processing device according to the first aspect acquires a captured image, which is captured from above, of a region including a road area, position information for a vehicle that is positioned in the region, and operation information for the vehicle, uses the position information and operation information to determine a parking area, uses the parking area to identify the road area included in the captured image, and extracts vehicles traveling in the road area to estimate a traffic volume. This enables the traffic volume of vehicles in the road area to be accurately estimated in a case in which the traffic volume is estimated using the captured image.

An information processing device according to a second aspect is the information processing device according to the first aspect, wherein: the acquisition section is configured to acquire the position information and the operation information from the vehicles, which are running, and in a case in which there is a period of time in which the position information and the operation information cannot be acquired and the position information before and after the period of time indicate a same position, the determination section is configured to determine that a position indicated by the position information is the parking area.

The information processing device according to the second aspect enables a more accurate determination of a parking area.

An information processing device according to a third aspect is the information processing device according to the first aspect or the second aspect, wherein the operation information includes at least one of a state of a vehicle shift range, a vehicle speed or a vehicle steering angle.

The information processing device according to the third aspect enables a road area and a parking area to be identified based on travel data of the vehicle.

An information processing device according to a fourth aspect is the information processing device according to any one of the first aspect to the third aspect, wherein the estimation section is an estimation model that has undergone machine learning in order to estimate the traffic volume using captured images, captured in the past, and the estimation model outputs the traffic volume of the road area included in the acquired captured image, with an estimation result by the determination section and the acquired captured image as inputs.

The information processing device according to the fourth aspect enables a traffic volume in an actually captured image to be estimated based on traffic volume in captured images that were captured in the past.

An information processing program according to a fifth aspect causes a computer to execute processing, the processing including: acquiring a captured image, which is captured from above, of a region including a road area, position information for a vehicle that is positioned in the region, and operation information relating to an operation of the vehicle; using the position information and the operation information to determine a parking area in which the vehicle is parked; and using the parking area to identify the road area included in the captured image, extract vehicles present in the road area, and estimate a traffic volume in the road area.

A computer executing the information processing program according to the fifth aspect acquires a captured image, which is captured from above, of a region including a road area, position information for a vehicle that is positioned in the region, and operation information for the vehicle, uses the position information and the operation information to determine a parking area, uses the parking area to identify the road area included in the captured image, and extracts vehicles traveling in the road area to estimate a traffic volume. This enables the traffic volume of vehicles in the road area to be accurately estimated in a case in which the traffic volume is estimated using the captured image.

According to the present disclosure, in a case in which the traffic volume is estimated using the captured image, the traffic volume of the vehicles in the road area can be accurately estimated.

BRIEF DESCRIPTION OF THE DRAWINGS

Exemplary embodiments of the present disclosure will be described in detail based on the following figures, wherein.

DETAILED DESCRIPTION

Explanation follows regarding an information processing system including an information processing device of the present disclosure. An information processing system is a system that uses information relating to a vehicle (hereinafter referred to as "vehicle information"), which is acquired from an onboard unit installed at the vehicle, to extract vehicles from captured images, which are captured from above by an unmanned aerial vehicle (drone), an artificial satellite, or the like, and estimates a traffic volume. Note that explanation follows regarding a configuration in which the vehicle information according to the present exemplary embodiment is information that includes position information indicating a position of the vehicle and operation information relating to operation of the vehicle.

Overall Configuration

Figure 1:
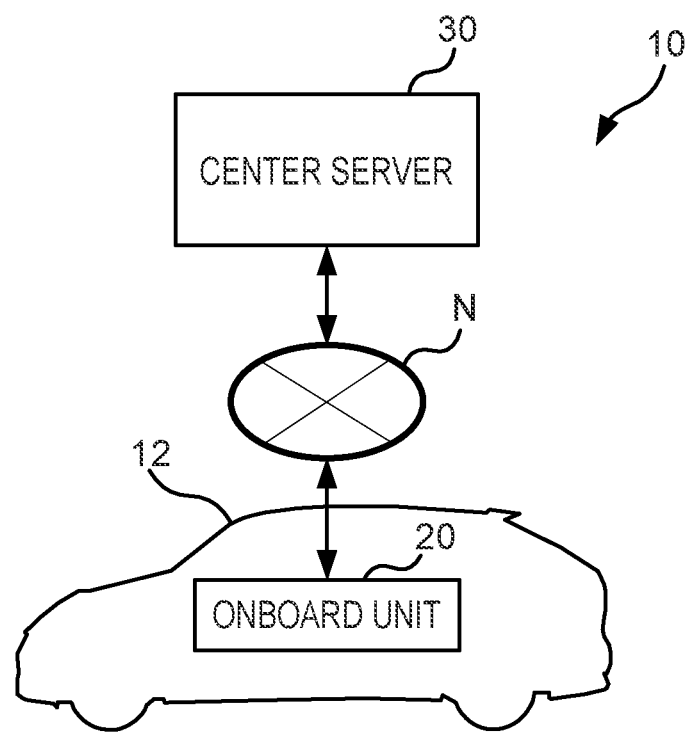
FIG. 1 is a diagram illustrating a schematic configuration of an information processing system according to an exemplary embodiment of the present disclosure.

As illustrated in FIG. 1, an information processing system 10 of an exemplary embodiment of the present disclosure includes a vehicle 12 and a center server 30 that serves as an information processing device. An onboard unit 20 is installed at the vehicle 12, and the onboard unit 20 is connected to a center server 30 via a network N.

Note that although FIG. 1 illustrates a single vehicle 12 including an onboard unit 20 with respect to a single center server 30, the number of vehicles 12, onboard units 20, and center servers 30 is not limited thereto.

The onboard unit 20 is a device that acquires vehicle information for the vehicle 12 and transmits the acquired vehicle information to the center server 30. Note that the vehicle information according to the present exemplary embodiment includes position information that indicates a position of the vehicle 12 detected from each device installed at the vehicle 12, and operation information relating to operation of the vehicle 12.

The center server 30 is installed, for example, at a manufacturer that manufactures the vehicle 12 or at a car dealer affiliated with the manufacturer. The center server 30 acquires vehicle information from the onboard unit 20, and uses the acquired vehicle information and a captured image corresponding to the position information included in the vehicle information to extract vehicles included in the captured image to thereby estimate a traffic volume of a road area included in the captured image. The center server 30 then uses the position information and the operation information included in the vehicle information to determine a parking area in which the vehicle is parked, and identifies a captured image from the parking area to estimate the traffic volume in the road area.

Vehicle

Figure 2:
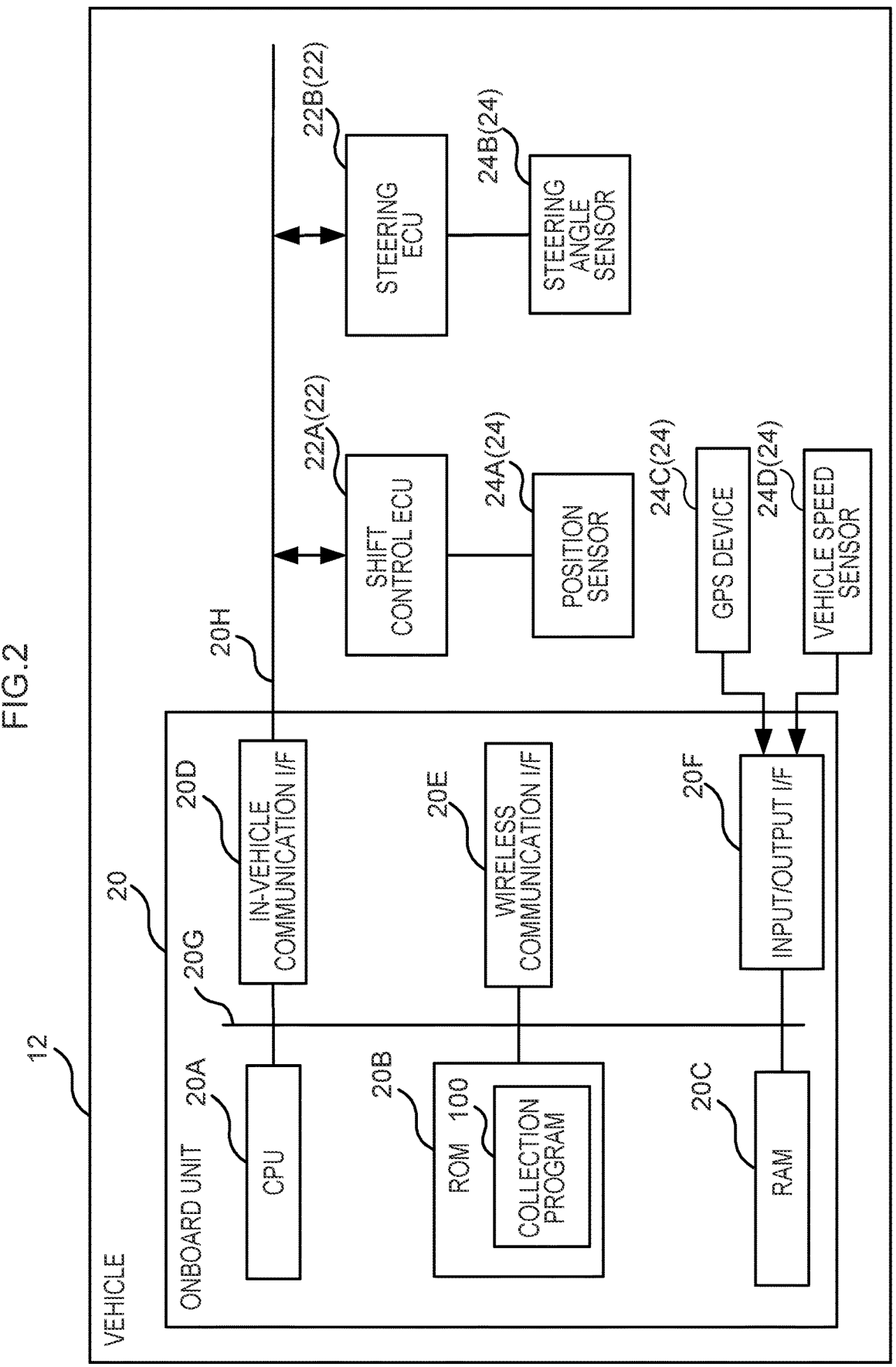
FIG. 2 is a block diagram illustrating a hardware configuration of a vehicle of an exemplary embodiment of the present disclosure.

As illustrated in FIG. 2, the vehicle 12 according to the present exemplary embodiment includes the onboard unit 20, plural electronic control units (ECUs) 22, and onboard devices 24.

The onboard unit 20 includes a central processing unit (CPU) 20A, read only memory (ROM) 20B, random access memory (RAM) 20C, an in-vehicle communication interface (I/F) 20D, a wireless communication I/F 20E, and an input/output I/F 20F. The CPU 20A, the ROM 20B, the RAM 20C, the in-vehicle communication I/F 20D, the wireless communication I/F 20E, and the input/output I/F 20F are connected so as to be capable of communicating with each other via an internal bus 20G.

The CPU 20A is a central processing unit that executes various programs and controls various components. Namely, the CPU 20A reads a program from the ROM 20B, and executes the program using the RAM 20C as a workspace.

The ROM 20B stores programs and various data. The ROM 20B of the present exemplary embodiment stores a collection program 100 that collects vehicle information for the vehicle 12 from the ECU 22. Along with execution of the collection program 100, the onboard unit 20 executes processing to transmit the vehicle information to the center server 30. The RAM 20C serves as a workspace to temporarily store programs and data.

The in-vehicle communication I/F 20D is an interface for connecting to the respective ECUs 22. A communication protocol based on the CAN protocol is used as the interface. The in-vehicle communication I/F 20D is connected to an external bus 20H. The in-vehicle communication I/F 20D is connected to a shift control ECU 22A and a steering ECU 22B.

The wireless communication I/F 20E is a wireless communication module for communicating with the center server 30. For example, a communication protocol such as 5G, LTE, or Wi-Fi (registered trademark) is used as the wireless communication module. The wireless communication I/F 20E is connected to the network N.

The input/output I/F 20F is an interface for communicating with the onboard devices 24. The input/output I/F 20F is connected to a global positioning system (GPS) device 24C and a vehicle speed sensor 24D as the onboard devices 24.

The shift control ECU 22A detects a change in a state of the vehicle shift range by a non-illustrated shift lever, and controls the state of the shift range of the vehicle 12. The shift control ECU 22A is connected to a position sensor 24A that detects a change in the vehicle shift range. The position sensor 24A detects, for example, a change from one vehicle shift range to another vehicle shift range from among [D], [R], [P], and [N], which are indicated by the shift lever.

The steering ECU 22B controls power steering. A steering angle sensor 24B, which configures the onboard device 24, is connected to the steering ECU 22B, and the steering angle sensor 24B detects a vehicle steering angle of a steering wheel.

The GPS device 24C is a device that measures the current position of the vehicle 12. The GPS device 24C includes a non-illustrated antenna that receives signals from a GPS satellite. Note that the GPS device 24C may be connected to the onboard unit 20 via a non-illustrated car navigation system. The vehicle speed sensor 24D is a sensor that detects the speed of the vehicle 12.

Figure 3:
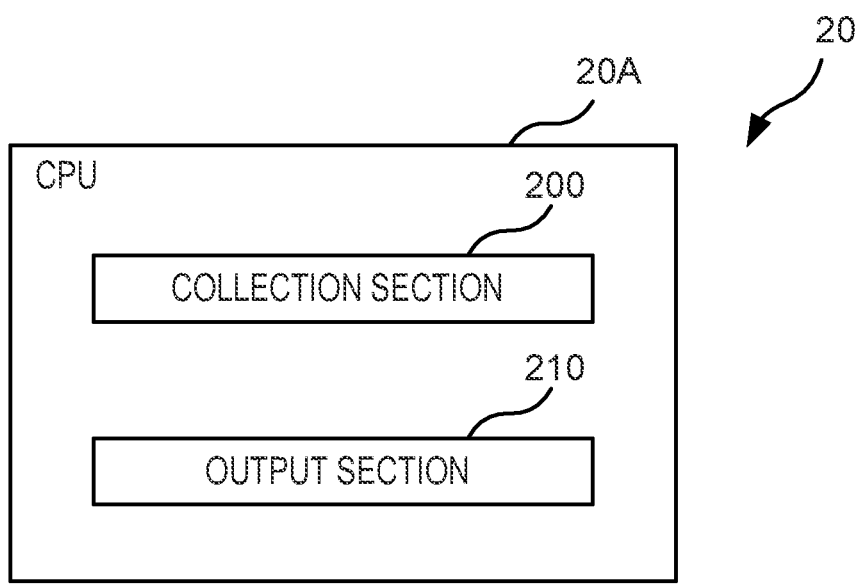
FIG. 3 is a block diagram illustrating a functional configuration of an onboard unit of an exemplary embodiment of the present disclosure.

As illustrated in FIG. 3, in the onboard unit 20 of the present exemplary embodiment, the CPU 20A executes the collection program 100 to function as a collection section 200 and an output section 210.

The collection section 200 has a function of collecting vehicle information that is output from the respective ECUs 22 and onboard devices 24 of the vehicle 12. Note that the collection section 200 has a function of collecting position information and operation information for the vehicle 12 as vehicle information. Further, note that the position information is, for example, coordinates of latitude, longitude, and the like of the vehicle 12 for which a position has been measured by the GPS device 24C. Moreover, the operation information is information including, for example, the state of the vehicle shift range, the vehicle speed, and the steering angle of the vehicle.

The output section 210 has a function of outputting the vehicle information collected by the collection section 200 to the center server 30.

Center Server

Figure 4:
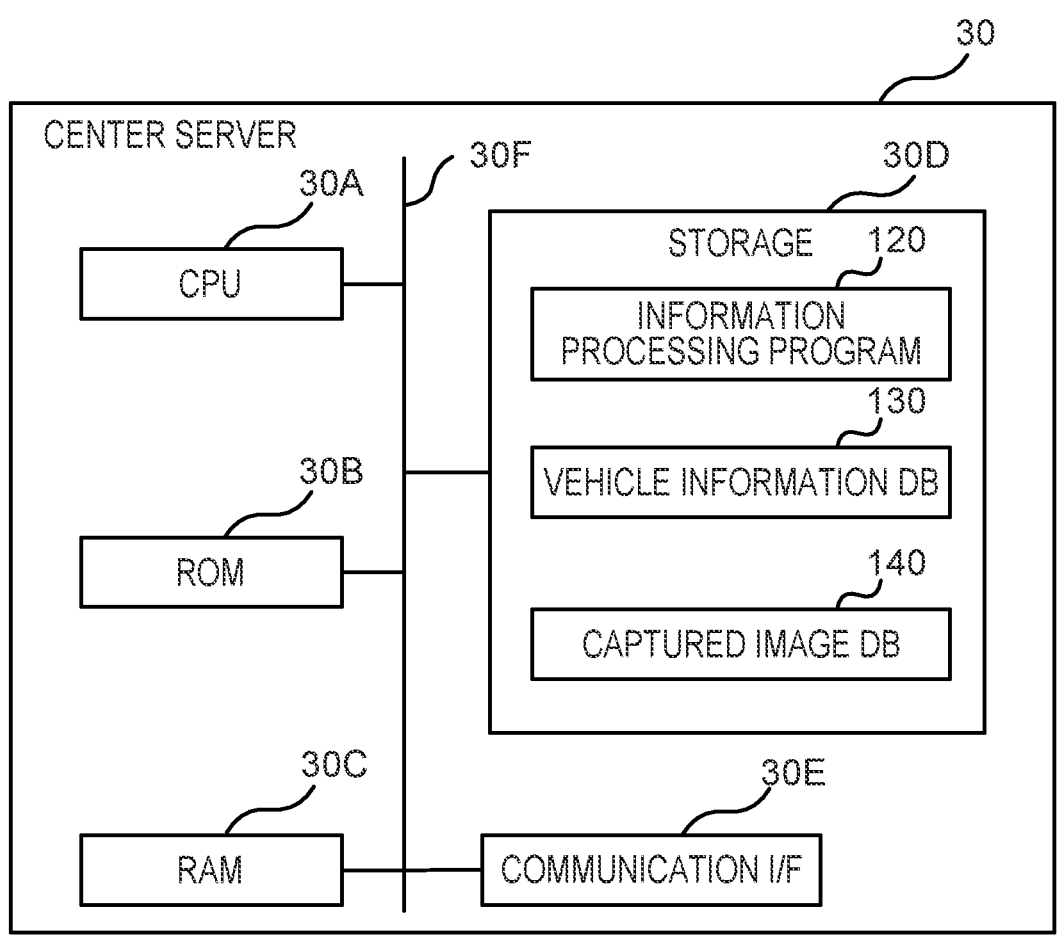
FIG. 4 is a block diagram illustrating a hardware configuration of a center server of an exemplary embodiment of the present disclosure.

As illustrated in FIG. 4, the center server 30 includes a CPU 30A, ROM 30B, RAM 30C, storage 30D, and a communication I/F 30E. The CPU 30A, the ROM 30B, the RAM 30C, the storage 30D, and the communication I/F 30E are connected so as to be capable of communicating with each other via an internal bus 30F. The functions of the CPU 30A, the ROM 30B, the RAM 30C, and the communication I/F 30E are the same as the functions of the CPU 20A, the ROM 20B, the RAM 20C, and the wireless communication I/F 20E of the onboard unit 20 described above. Note that the communication I/F 30E may perform wired communication.

The storage 30D, which serves as a storage medium, is configured by a hard disk drive (HDD) or a solid state drive (SSD), and stores various programs and various data. The storage 30D of the present exemplary embodiment stores an information processing program 120, a vehicle information database (hereinafter referred to as "vehicle information DB") 130, and a captured image database (hereinafter referred to as "captured image DB") 140. Note that the ROM 30B may store the information processing program 120, the vehicle information DB 130, and the captured image DB 140.

The information processing program 120 serves as a program to control the center server 30. Along with execution of the information processing program 120, the center server 30 executes various processing including processing to acquire vehicle information and a captured image, and processing to estimate a traffic volume using the vehicle information and the captured image.

The vehicle information DB 130 stores vehicle information that is received from the onboard unit 20. The captured image DB 140 stores captured images input into the center server 30.

Figure 5:
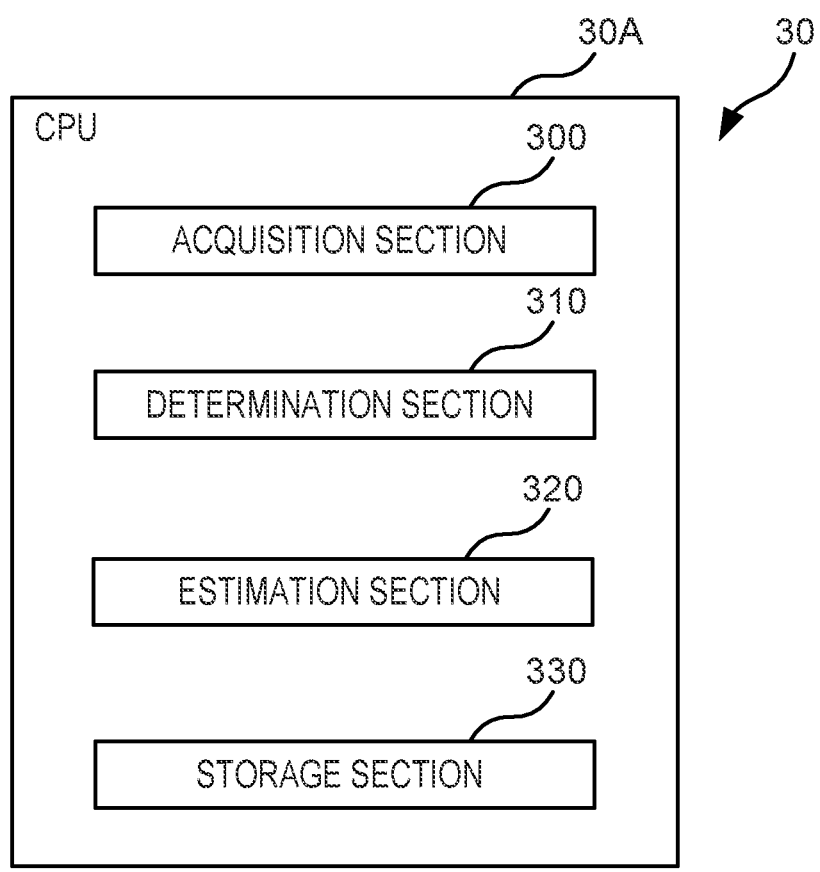
FIG. 5 is a block diagram illustrating a functional configuration of a center server of an exemplary embodiment of the present disclosure.

As illustrated in FIG. 5, in the center server 30 of the present exemplary embodiment, the CPU 30A executes the information processing program 120 so as to function as an acquisition section 300, a determination section 310, an estimation section 320, and a storage section 330.

The acquisition section 300 has a function of acquiring vehicle information that is transmitted from the onboard unit 20 of the vehicle 12, as well as captured images which are captured from above by an artificial satellite or the like.

The determination section 310 uses the vehicle information to determine a parking area in which the vehicle is parked from among the areas indicated by the captured image. More specifically, the determination section 310 determines the parking area using the operation information that is included in the vehicle information. For example, the determination section 310 determines parking of the vehicle 12 from a state of the vehicle shift range included in the operation information (for example, a state in which the vehicle shift range is [P] or [N]), and determines the position of the vehicle 12 as the parking area. Moreover, the determination section 310 determines parking of the vehicle 12 based on, for example, a change in the state of the vehicle shift range, a change in the vehicle steering angle, and the vehicle speed, over a predetermined period of time, and determines the position of the vehicle 12 as the parking area. Moreover, in a case in which vehicle information is acquired from the vehicle 12 that is running, the determination section 310 extracts a period of time in which vehicle information cannot be acquired, and in a case in which the position information of the vehicle 12 is the same before and after the period of time in which vehicle information cannot be acquired, the determination section 310 determines the position indicated by the position information as the parking area.

Note that in the present exemplary embodiment, explanation has been given regarding an example in which a parking area is determined using vehicle information. However, there is no limitation thereto. The parking area may be determined using map information. For example, the determination section 310 extracts a road area from the map information as an edge, extracts an intersection as a node, and determines an area surrounded by the edge and the node as a parking area. By using the map information, the parking area is also determined at a position (for example, near a boundary between the parking area and the road area) that is not obtained from the position information included in the vehicle information.

The estimation section 320 uses the determination result by the determination section 310 to identify a road area included in the captured image, extracts the vehicle 12 present at a position corresponding to the road area from a captured image 400, and estimates the traffic volume in the road area. More specifically, the estimation section 320 is an estimation model that extracts vehicles included in a captured image and performs machine learning to estimate a traffic volume, and outputs the traffic volume of a road area using the determination result by the determination section 310 and the captured image as inputs.

Figure 6:
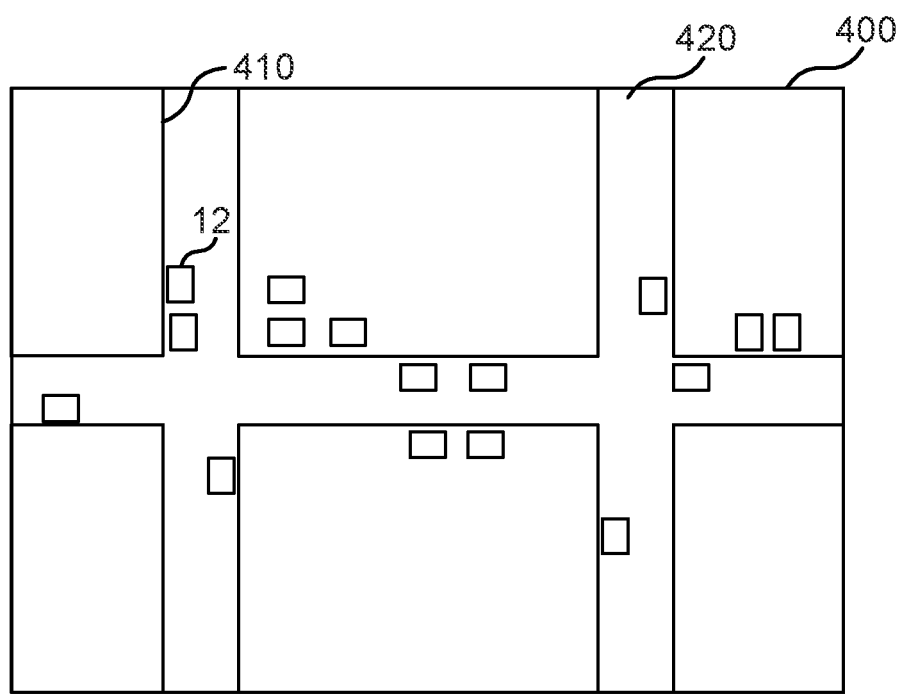
FIG. 6 is a schematic diagram illustrating an example of a captured image in an exemplary embodiment of the present disclosure.
Figure 7:
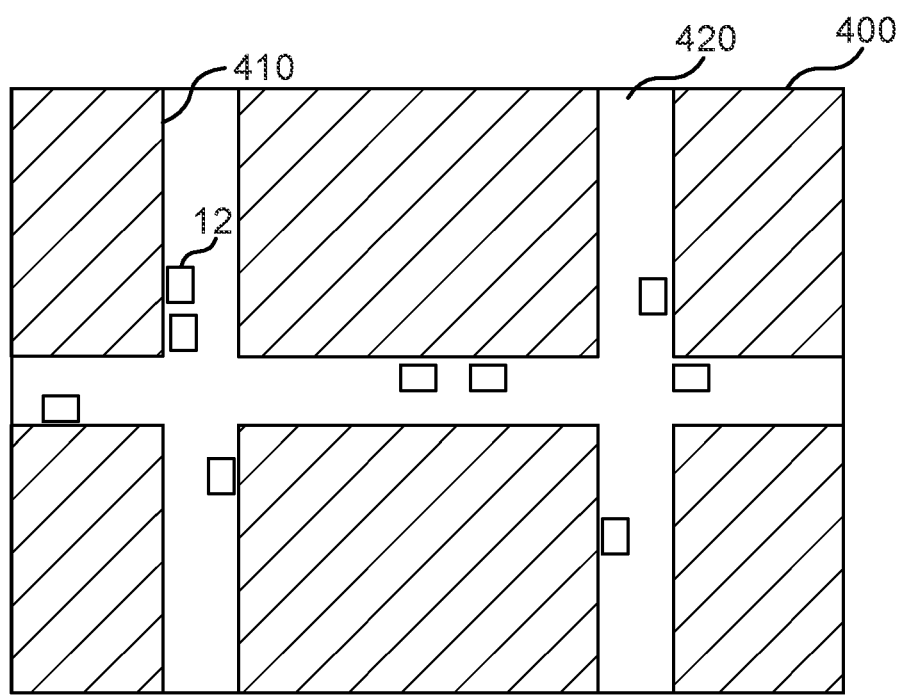
FIG. 7 is a schematic diagram illustrating an example of a captured image used in a specific explanation of a road area in an exemplary embodiment of the present disclosure.

As an example, in FIG. 6, the estimation section 320 applies the position of the parking area 410 as a determination result to the captured image 400, masks the parking area 410 in the captured image 400, and identifies the road area 420. FIG. 7 is the captured image 400 illustrating an example in which the determined parking area 410 is applied to identify a road area 420.

The estimation section 320 extracts the vehicles 12 in the identified road area 420, and estimates and outputs the traffic volume in the road area 420 from the number of vehicles 12.

Note that in the present exemplary embodiment, explanation has been given regarding an example in which the traffic volume is estimated using, as inputs, the position of the parking area 410 as a determination result, and the captured image 400. However, there is no limitation thereto. The traffic volume may be estimated using, as an input, the captured image 400 to which the position of the parking area 410 has been applied as a determination result (masking the parking area 410).

Moreover, the estimation model according to the present exemplary embodiment may be generated using learning data selected and generated by a user, or may be generated using the vehicle information that is stored in the vehicle information DB 130 and the captured images 400 that are stored in the captured image DB 140.

The storage section 330 stores the acquired vehicle information in the vehicle information DB 130, and stores the acquired captured image 400 in the captured image DB 140. Note that explanation has been given regarding an example in which the storage section 330 according to the present exemplary embodiment stores vehicle information and the captured image 400. However, there is no limitation thereto. The storage section 330 may store the position of the parking area 410 as the determination result by the determination section 310, and the identified road area 420. For example, the storage section 330 may store the parking area 410 that is determined by the determination section 310, and the estimation section 320 may identify the parking area 410 in the captured image 400 by applying the parking area 410 corresponding to the captured image 400 from among stored parking areas 410. Moreover, the storage section 330 may store the road area 420 identified in the past by the estimation section 320, and the estimation section 320 may estimate the traffic volume by extracting the vehicles 12 from the road area 420 corresponding to the captured image 400 from among stored road areas 420.

Flow of Control

Figure 8:
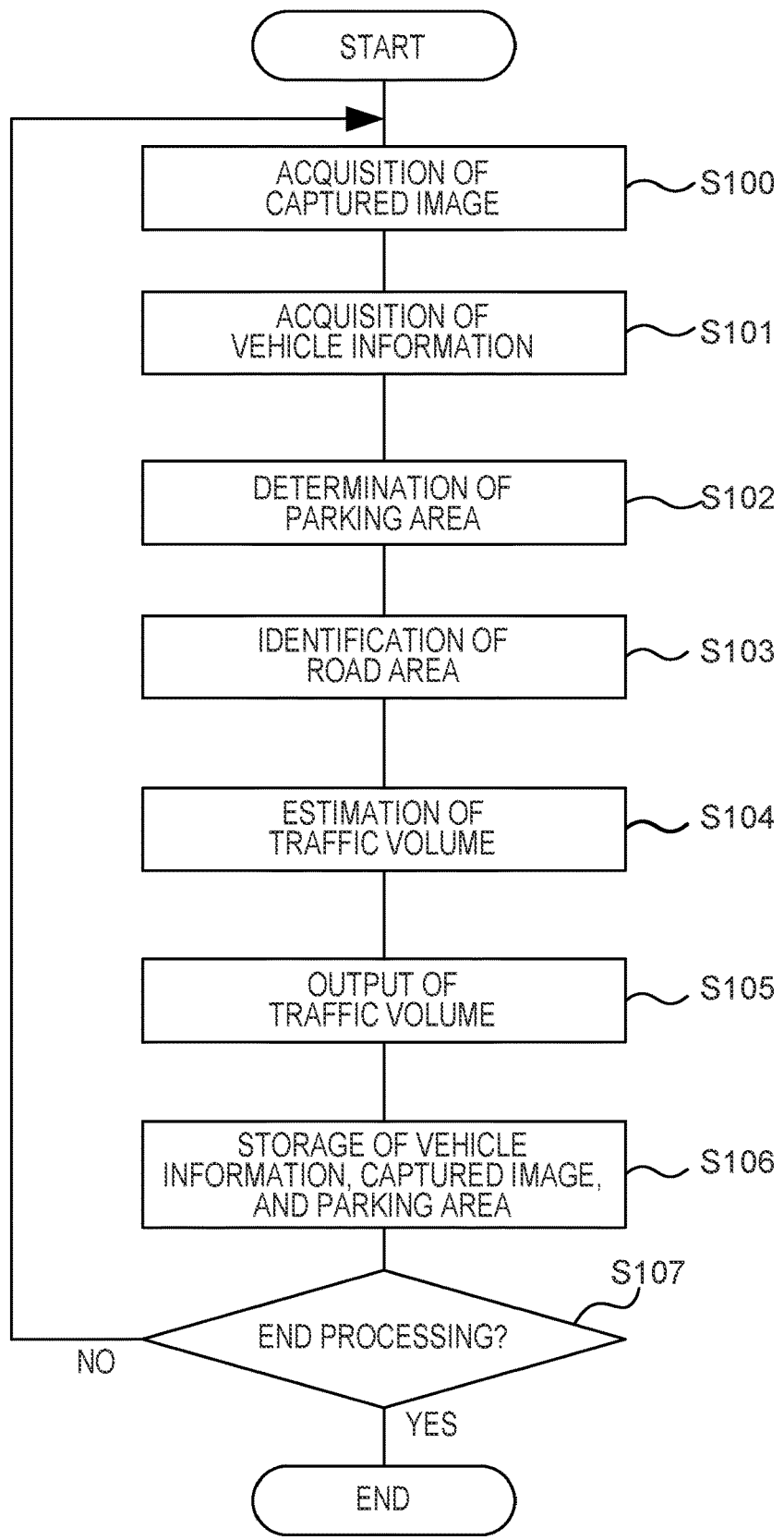
FIG. 8 is a flowchart illustrating a flow of processing to estimate a traffic volume, executed by the center server of an exemplary embodiment of the present disclosure.

Explanation follows regarding a flow of the respective processing executed by the information processing system 10 of the present exemplary embodiment, with reference to the flowchart of FIG. 8. The respective processing performed by the center server 30 is executed by the CPU 30A of the center server 30 functioning as the acquisition section 300, the determination section 310, the estimation section 320, and the storage section 330. The processing for estimating the traffic volume illustrated in FIG. 8 is executed in a case in which, for example, the captured image 400 is input and an instruction to estimate the traffic volume is input.

At step S100, the CPU 30A acquires the input captured image 400.

At step S101, the CPU 30A acquires vehicle information corresponding to the region indicated by the captured image 400.

At step S102, the CPU 30A uses the vehicle information to determine a position corresponding to the parking area 410.

At step S103, the CPU 30A applies the determined position of the parking area 410 to the captured image 400 to identify the road area 420 in the captured image 400.

At step S104, the CPU 30A extracts the vehicles 12 in the identified road area 420, and estimates the traffic volume in the road area 420 from the number of extracted vehicles 12.

At step S105, the CPU 30A outputs the estimated traffic volume.

At step S106, the CPU 30A stores the vehicle information, the captured image 400, and the parking area 410.

At step S107, the CPU 30A determines whether or not to end the processing to estimate traffic volume. In a case in which the processing to estimate the traffic volume is ended (step S107: YES), the CPU 30A ends the processing to estimate the traffic volume. On the other hand, in a case in which the processing to estimate the traffic volume is not ended (step S107: NO), the CPU 30A transitions to step S100, and acquires the input captured image.

Summary

The center server 30 serving as an information processing device of the present exemplary embodiment acquires the captured image 400, which is captured from above a region including the road area 420, the position information for the vehicle that is positioned in the region, and the operation information of the vehicle 12, determines the parking area 410 using the position information and the operation information, identifies the road area 420 included in the captured image 400 using the parking area 410, and extracts the vehicles 12 traveling on the road area 420 to estimate the traffic volume.

As described above, according to the present exemplary embodiment, in a case in which the traffic volume is estimated using the captured image 400, the traffic volume of the vehicles 12 in the road area 420 can be accurately estimated.

Notes

Note that the various processing executed by the CPU 20A and the CPU 30A reading and executing software (a program) in the above-described exemplary embodiments may be executed by various types of processor other than a CPU. Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the above-described processing may be executed by one of these various types of processors, or may be executed by combining two or more of the same type or different types of processors (for example, plural FPGAs, or a combination of a CPU and an FPGA, or the like). Moreover, a hardware configuration of the various processors is specifically formed as an electric circuit combining circuit elements such as semiconductor elements.

Further, explanation have been given regarding an example in which the respective programs are stored (installed) in advance in a non-transitory storage medium readable by a computer in the above-described exemplary embodiments. For example, the collection program 100 in the onboard unit 20 is stored in advance in the ROM 20B, and the information processing program 120 in the center server 30 is stored in advance in the storage 30D. However, there is no limitation thereto, and the respective programs may be provided in a format recorded on a non-transitory storage medium such as compact disc read only memory (CD-ROM), digital versatile disc read only memory (DVD-ROM), or universal serial bus (USB) memory. Alternatively, the programs may be provided in a format downloadable from an external device over a network.

The flow of processing described in the above-described exemplary embodiments are examples, and unnecessary steps may be deleted, new steps may be added, or the processing order may be rearranged within a range not departing from the spirit of the present disclosure.

What is claimed is:

1. An information processing device comprising:
a memory; and
a processor coupled to the memory, wherein the processor is configured to:

acquire a captured image, which is captured from above, of a region including a road area, position information for a vehicle that is positioned in the region, and operation information relating to an operation of the vehicle;

use the position information and the operation information to determine a parking area in which the vehicle is parked;

use the parking area to identify the road area included in the captured image, extract vehicles present in the road area, and estimate a traffic volume in the road area;

generate an estimation model using learning data that is selected and generated by a user;

estimate, by performing machine learning using the estimation model, the traffic volume using captured images, captured in the past; and output the traffic volume of the road area included in the acquired captured image, with an estimation result by the processor and the acquired captured image as inputs.

2. The information processing device according to claim 1, wherein the processor is configured to:

acquire the position information and the operation information from the vehicles, which are running, and in a case in which there is a period of time in which the position information and the operation information cannot be acquired and the position information before and after the period of time indicate a same position, determine that a position indicated by the position information is the parking area.

3. The information processing device according to claim 1, wherein the operation information includes at least one of a state of a vehicle shift range, a vehicle speed, or a vehicle steering angle.

4. An information processing system comprising:

the information processing device according to claim 3, the information processing device including a center server; and the vehicle including:
an onboard unit comprising a central processing unit,
a position range sensor configured to detect a change of the vehicle shift range, and
a plurality of electronic control units, at least one of which is configured to control the state of the vehicle shift range, wherein
the onboard unit is configured to transmit, to the processor of the information processing device, the operation information including the detected change and the state of the vehicle shift range to determine the parking area.

5. A non-transitory storage medium storing an information processing program that is executable by a processor to perform processing, the processing comprising:

acquiring a captured image, which is captured from above, of a region including a road area, position information for a vehicle that is positioned in the region, and operation information relating to an operation of the vehicle;

using the position information and the operation information to determine a parking area in which the vehicle is parked;

using the parking area to identify the road area included in the captured image, extract vehicles present in the road area, and estimate a traffic volume in the road area;

generating an estimation model using learning data that is selected and generated by a user;

estimating, by performing machine learning using the estimation model, the traffic volume using captured images, captured in the past; and output the traffic volume of the road area included in the acquired captured image, with an estimation result by the processor and the acquired captured image as inputs.

* * * * *